UNITED STATES PATENT OFFICE.

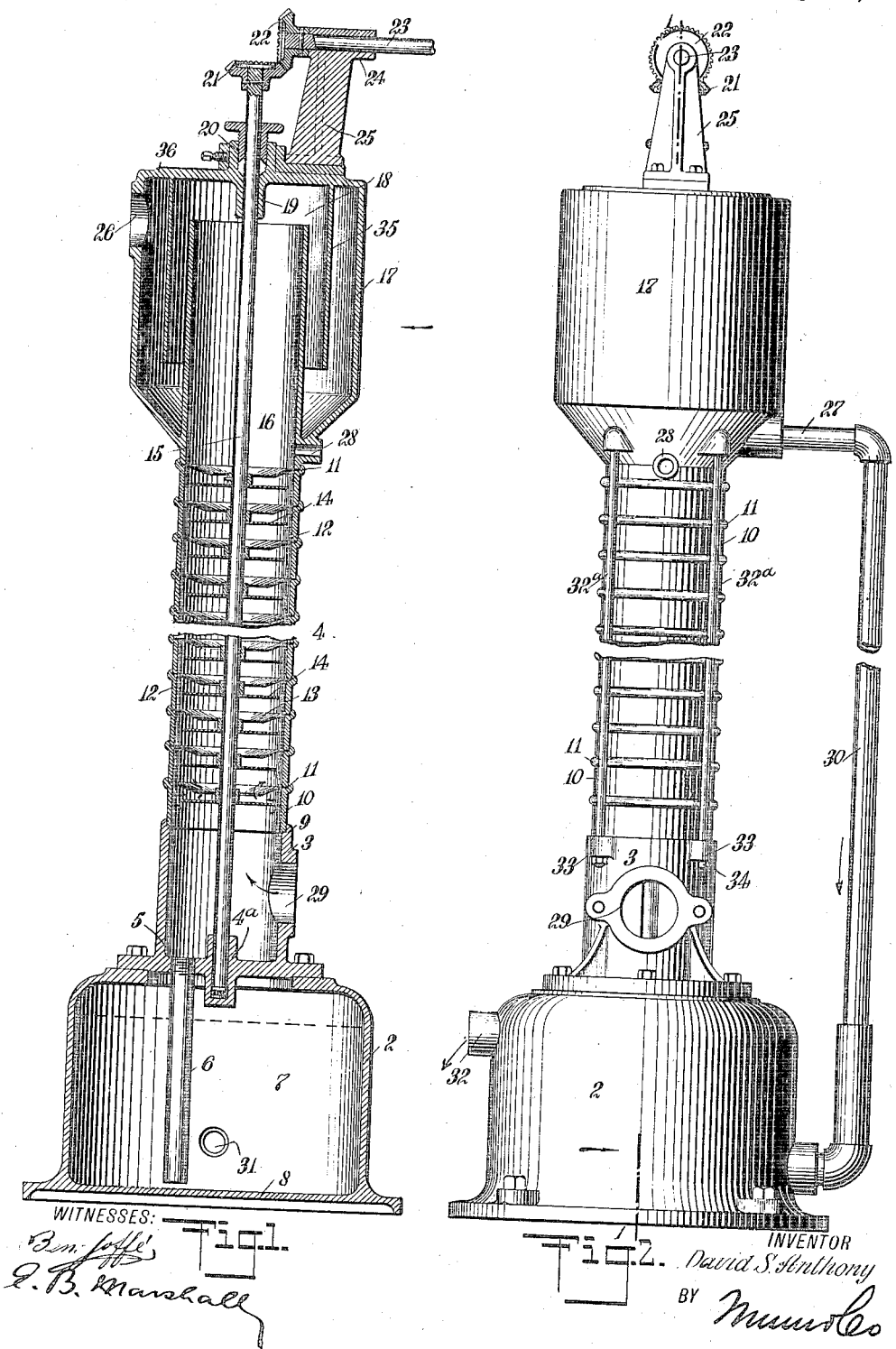

DAVID SMITH ANTHONY, OF DURANGO, MEXICO, ASSIGNOR OF ONE-THIRD TO EDWARD WILLIAMS AND ONE-THIRD TO GEORGE F. HABERNIGG, OF DURANGO, MEXICO.

APPARATUS FOR CLEANING GAS.

971,481.  Specification of Letters Patent.  Patented Sept. 27, 1910.

Application filed February 11, 1910. Serial No. 543,259.

*To all whom it may concern:*

Be it known that I, DAVID SMITH ANTHONY, a citizen of the United States, and a resident of Durango, Mexico, have invented a new and Improved Apparatus for Cleaning Gas, of which the following is a full, clear, and exact description.

My invention relates to the art of cleaning gas, and it has for its object to provide means which will cause water or other fluid to flow against the flow of gas, the water or other fluid being given a transverse, or rotary, movement relatively to the gas in the direction of its flow as the gas passes therethrough.

Another object of the invention is to provide a shaft with disks, the shaft being adapted to rotate to cause the water flowing through the device to be given a rotary movement, and a further object of the invention is to provide upper and lower chambers, the upper chamber having a pipe leading therefrom to draw off any water which may collect, the pipe extending to a lower chamber having a water seal in which water flowing down through the device, is collected.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in both views, and in which—

Figure 1 is a sectional view on the line 1—1 of Fig. 2, and Fig. 2 is an elevation of the device.

By referring to the drawings it will be seen that a lower or base member 2 is provided, to the top of which is secured a section 3 of a conduit or tower 4, said section 3 having a bearing 4ª, and an annular opening 5 in which is secured a pipe 6, which extends into a chamber 7 in the base member 2. The lower terminal of the pipe 6 is disposed in close proximity to the bottom 8 of the said chamber 7. At the upper end of the section 3, there is an annular, inner recess 9, in which is disposed the lower end of one of a series of collars 10, each of which has an annular, upwardly-projecting flange 11, adapted to be disposed around the lower end of the collar 10, above it, so that the walls of the collars 10 will form the conduit or tower 4, as shown in the drawings.

Disks 12 are disposed in the conduit or tower 4, the peripheries of said disks each being disposed on the upper ends of the walls of the collars 10 and within the upwardly-projecting flanges 11, so that they are held in position by the next collars 10, respectively, the collars serving to clamp the disks 12 and hold them in position. If desired, the collars 10 may be soldered, riveted or held together by any suitable means. Each of the disks 12 has a central, annular opening 13, the disks 12 being inclined downwardly toward the said openings. Between each of the disks 12 there is a disk 14, the disks 14 being secured to a shaft 15, the lower end of which is journaled in the bearing 4ª. The peripheries of the disks 14 are spaced from the inner wall of the conduit or tower 4. The annular, upwardly-projecting flange 11 of the upper collar 10, is disposed around a section 16, which forms a continuation of the conduit or tower 4, there being an upper member 17 having a chamber 18, said member 17 being preferably integral with the said section 16, which latter projects upwardly into the said chamber 18. The walls of the member 17 converge downwardly, the diameter of the body of the member 17 being considerably greater than the diameter of the said section 16. At the top of the upper member 17, there is a bearing 19, in which the shaft 15 is journaled, and the usual stuffing box 20 is provided to prevent the escape of the gas which collects in the chamber 18. To the shaft 15 is secured a bevel gear 21, which meshes with a bevel gear wheel 22 secured to a shaft 23 journaled in a bearing 24, supported on the member 17 by a standard 25.

In the upper member 17 there is an outlet 26 for the gas, and in the lower portion of the upper member 17 there is an opening to which is connected a pipe 27 adapted to carry off any water which may travel upwardly with the gas and collect in the chamber 18. In the section 16 there is a port 28 through which water may be supplied to the device. In the side of the section 3, at a distance from its bottom, there is an inlet port 29 for the gas. The pipe 27 communicates with the lower or base member 2 by means of a pipe 30, which communicates with a port 31 in the lower or base member 2 near its bottom. Near the top of the lower or base member 2 is an overflow 32. It will therefore be seen that the water collecting in the chamber 7 of the lower or base member 2, forms a water seal at the lower terminals of the pipes 30 and 6.

In using my invention, the shaft 23 is rotated and, by means of the bevel gear wheels 22 and 21 rotates the shaft 15 which causes the disks 14 to rotate. Water is then led to the section 16 through the port 28, the water falling on the upper disk 12 and running toward its center, passing through the opening 13 in the upper disk and falling on the upper disk 14 which rotates with the shaft 15. As the water strikes the disk 14, it receives a rotary motion, being assisted toward the periphery of the disk 14 by centrifugal force and falling to the next disk 12, toward the center of which it flows, striking the next disk 14 and passing over its periphery in the same manner as over the first disk 14. In this way water flows from the top to the bottom of the conduit or tower 4. The gas flows into the conduit or tower from the port 29, passing around the peripheries of the disks 14 and through the openings 13 in the disks 12 against the flow of water. It will therefore be seen that it is necessary for the gas to flow through water, which not only falls over the periphery of the disk 14 and through the openings 13 of the disks 12, but which also receives a rotary motion through the movement of the disks 14. The water collecting in the section 3, passes down through the pipe 6 into the chamber 7 of the lower or base member 2. As the gas rises through the conduit or tower 4, it collects in the chamber 18 of the upper member 17, from which it passes through the port 26. Any water which may be carried upwardly with the gas, collects in the bottom of the chamber 18, such water passing through the pipe 27 and the pipe 30 to the port 31 of the lower or base member 2, the water seal in the said lower or base member 2 preventing any gas from collecting in the said lower or base member. When the water in the lower or base member 2 reaches a predetermined height above the lower terminal of the pipe 6 and the port 31, it is carried off through the overflow 32.

While the collars 10 may be soldered or riveted, as has been described, I prefer to provide bars 32ª which are secured to the upper member 17 and are disposed downwardly therefrom, the said bars 32ª projecting through orifices in lugs 33 and having screw threads at their lower terminals, with which nuts 34 mesh. The said bars 32ª when in connection with the lugs 33 and the nuts 34, tend to force the upper member 17 downwardly and thereby hold the several collars together, any lateral movement of the collars being prevented by means of the upwardly-extending annular flanges 11.

Depending from the top 36 of the member 17 and disposed in the chamber 18, there is an annular curtain 35, which does not extend to the bottom of the said chamber 18, the object of this construction being to direct the gas downwardly from the top of the section 16 before it passes out of the port 26, whereby the moisture is collected in the bottom of the chamber 18.

Having thus described my invention, I claim as new and desire to secure by Letters Patent:

1. In a gas cleaner, a plurality of collars, constructed to be secured together to form a conduit, a set of disks with central openings, the peripheries of the disks being secured between the collars respectively, to be supported in the conduit, a shaft disposed through the openings in the disks, and a second set of disks between the first-mentioned disks respectively, and secured to the shaft.

2. In a gas cleaner, a plurality of collars, constructed to be secured together to form a conduit, an upper member having a chamber, through an opening in which the vertical conduit extends, a set of disks with central openings, the peripheries of the disks being secured between the collars respectively, to be supported in the conduit, a shaft disposed in the conduit, through the openings in the disks, a second set of disks disposed between the first-mentioned disks respectively and secured to the shaft, the peripheries of the second disks not extending to the inner wall of the conduit, and a pipe leading from the chamber below the plane of the upper terminal of the conduit.

3. In a gas cleaner, a vertical conduit, an upper member having a chamber, through an opening in which the vertical conduit extends, a lower member having a chamber, a head at the lower terminal of the conduit, with a port, a pipe secured to the said head and communicating with the port, the pipe extending into the chamber in the lower member, and a second pipe leading from an opening in the upper member below the plane of the upper terminal of the conduit to an opening in the lower member near its bottom, affording communication between the two chambers.

4. In a gas cleaner, a conduit, an upper member having a chamber, through an opening in which the conduit extends, a lower member having a chamber, a head at the lower terminal of the conduit, with a port, a pipe secured to the said head and communicating with the port, the pipe having a free terminal extending into the chamber in the lower member, and a second pipe leading from an opening in the upper chamber to an opening in the lower member, affording communication between the two chambers, there being an overflow port in the lower member above the free terminal of the first-mentioned pipe and the opening in the lower chamber.

5. In a gas cleaner, a vertical conduit, an upper member having a chamber, through an opening in which the vertical conduit extends, a lower member having a chamber, a head at the lower terminal of the conduit, having a port, which communicates with the chamber in the lower member, and a pipe leading from an opening in the upper member to an opening in the lower member, affording communication between the two chambers.

6. In a gas cleaner, a conduit, an upper member having a chamber, with which the conduit communicates, a lower member having a chamber, a head at the lower terminal of the conduit, with a port, a pipe secured to the head which communicates with the port, the pipe having communication with the chamber in the lower member, and a second pipe leading through an opening in the upper chamber to an opening in the lower chamber, affording communication between the two chambers, there being an overflow in the lower member above the levels of which the said pipes communicate with the chamber and the said lower member.

In testimony whereof I have signed my name to this specification in the presence of two subscribing witnesses.

DAVID SMITH ANTHONY.

Witnesses:
GEORGE F. HABERNIGG,
EDWARD WILLIAMS.